US008030410B2

(12) United States Patent
Hall

(10) Patent No.: US 8,030,410 B2
(45) Date of Patent: Oct. 4, 2011

(54) METHOD FOR GENERATING FREE RADICAL CAPABLE POLYMERS USING CARBONYL-CONTAINING COMPOUNDS

(75) Inventor: James E. Hall, Mogadore, OH (US)

(73) Assignee: Bridgestone Corporation, Tokyo (JP)

( * ) Notice: Subject to any disclaimer, the term of this patent is extended or adjusted under 35 U.S.C. 154(b) by 519 days.

(21) Appl. No.: 11/618,095

(22) Filed: Dec. 29, 2006

(65) Prior Publication Data
US 2008/0161501 A1 Jul. 3, 2008

(51) Int. Cl.
C08C 19/00 (2006.01)
C08F 297/02 (2006.01)
(52) U.S. Cl. .................. 525/242; 525/383; 525/386
(58) Field of Classification Search ................ 525/386, 525/383, 242
See application file for complete search history.

(56) References Cited

U.S. PATENT DOCUMENTS

| 4,068,050 | A | | 1/1978 | Danzig et al. |
| 4,153,647 | A | * | 5/1979 | Glukhovskoi et al. ........ 525/250 |
| 4,429,091 | A | | 1/1984 | Hall |
| 4,476,240 | A | | 10/1984 | Hall et al. |
| 4,518,753 | A | | 5/1985 | Richards et al. |
| 4,550,142 | A | * | 10/1985 | Akita et al. .................. 525/236 |
| 4,581,429 | A | | 4/1986 | Solomon et al. |
| 4,591,624 | A | | 5/1986 | Hall |
| 4,845,165 | A | | 7/1989 | Halasa et al. |
| 4,960,831 | A | | 10/1990 | Willis et al. |
| 5,077,346 | A | | 12/1991 | Dias et al. |
| 5,322,912 | A | | 6/1994 | Georges et al. |
| 5,336,737 | A | * | 8/1994 | van Ballegooijen et al. ... 526/70 |
| 5,401,804 | A | | 3/1995 | Georges et al. |
| 5,549,998 | A | | 8/1996 | Georges et al. |
| 5,627,248 | A | | 5/1997 | Koster et al. |
| 5,677,388 | A | | 10/1997 | Koster et al. |
| 5,721,320 | A | | 2/1998 | Priddy et al. |
| 5,869,588 | A | | 2/1999 | Toan et al. |
| 5,919,871 | A | | 7/1999 | Nicol et al. |
| 5,959,033 | A | | 9/1999 | Demirors et al. |
| 6,103,846 | A | | 8/2000 | Willis et al. |
| 6,111,025 | A | | 8/2000 | Visger et al. |
| 6,228,908 | B1 | | 5/2001 | Takeichi et al. |
| 6,255,402 | B1 | | 7/2001 | Boutillier et al. |
| 6,271,308 | B1 | | 8/2001 | de Boer et al. |
| 6,333,381 | B1 | | 12/2001 | Asada et al. |
| 6,353,065 | B1 | | 3/2002 | Charleux et al. |
| 6,362,269 | B1 | | 3/2002 | Ishihata et al. |
| 6,369,162 | B1 | | 4/2002 | Visger et al. |
| 6,376,615 | B1 | | 4/2002 | Guerrero-Santos et al. |
| 6,420,502 | B1 | | 7/2002 | Chung |
| 6,444,754 | B1 | | 9/2002 | Chin et al. |
| 6,462,143 | B1 | * | 10/2002 | Willis et al. .................. 525/370 |
| 6,476,133 | B1 | | 11/2002 | Jungling et al. |
| 6,521,710 | B1 | | 2/2003 | Roth et al. |
| 6,525,140 | B1 | | 2/2003 | Dedecker |
| 6,525,151 | B1 | | 2/2003 | Roth et al. |
| 6,531,547 | B1 | | 3/2003 | Visger et al. |
| 6,624,263 | B2 | | 9/2003 | Matyjaszewski et al. |
| 6,673,892 | B2 | | 1/2004 | Martinez et al. |
| 6,762,218 | B2 | | 7/2004 | Geprags et al. |
| 6,780,917 | B2 | | 8/2004 | Hashimoto et al. |
| 7,125,940 | B2 | | 10/2006 | Willis |
| 2002/0045685 | A1 | | 4/2002 | Ogoe et al. |
| 2003/0050411 | A1 | | 3/2003 | Gaynor et al. |
| 2003/0065097 | A1 | | 4/2003 | De Groot et al. |
| 2003/0069332 | A1 | | 4/2003 | Agostini et al. |
| 2004/0030021 | A1 | | 2/2004 | Mitsunaga et al. |
| 2004/0157994 | A1 | | 8/2004 | Kubo et al. |
| 2005/0027071 | A1 | | 2/2005 | Deeter et al. |
| 2006/0241265 | A1 | | 10/2006 | Harwood et al. |
| 2008/0161485 | A1 | * | 7/2008 | Suzuki et al. .................. 524/575 |

FOREIGN PATENT DOCUMENTS

| JP | 2005-043331 | * | 2/2005 |
| WO | WO 97/36894 A1 | | 10/1997 |
| WO | WO 97/49741 A1 | | 12/1997 |
| WO | WO 97/49742 A1 | | 12/1997 |
| WO | WO 99/46261 A1 | | 9/1999 |
| WO | WO 02/48109 A2 | | 6/2002 |
| WO | WO 2006/088187 A1 | * | 2/2007 |

OTHER PUBLICATIONS

Braun, Dietrich, "Alkane als initiatoren zur radikalischen polymerization", Angewandte Makromolekulare Chemie, vol. 223, Issue 1, pp. 69-79, Mar. 12, 2003, English Abstract.

Cameron, Neil R. et al., "Butyl Acrylate Polymerization Mediated by a Proxyl Nitroxide", Polymer Preprints 2002, 43 (2), p. 88.

Chin, Hui H., "Compatibilization of poly(phenylene ether) and polyamide-6,6 blends by functionalized polystyrenes", Annual Technical Conference—SPE (2002) 60th, vol. 2, pp. 1329-1333, Abstract only.

Frolov, V.M. et al., "Hydrogenation of Polybutadiene and Butadiene—Vinyltrimethyllsilane Copolymers in the Presence of Metal-Complex Catalysts", Polymer Science, Ser. A, vol. 43, No. 11, pp. 1114-1118, 2001.

Georges, M.K. et al., "Narrow Molecular Weight Resins by a Free-Radical Polymerization Process", Macromolecules, vol. 26, pp. 2987-2988, 1993.

Georges, Michael K. et al., "Stable Free Radical Polymerization Process-Initiation Mechanisms with Benzoyl Peroxide and Various Nitroxides", Polymer Preprints 2002, 43 (2), p. 78.

Gopalan, Padma et al., "Synthesis of Rod-Coil Diblock Copolymers via Nitroxide Functionalized Mesogenic Rod Segments", Polymer Preprints 2002, 43 (2), p. 110.

(Continued)

Primary Examiner — Jeffrey Mullis
(74) Attorney, Agent, or Firm — Meredith E. Hooker; Nathan T. Lewis

(57) ABSTRACT

Provided is a method comprising reacting the anionic living end of a polymer that is end capped with a steric hindering compound with a carbonyl-containing compound to produce a polymer with a homolytically cleaveable group. An engineered plastic may then be produced by adding the polymer containing a homolytically cleavable group to a solvent comprising at least one vinyl monomer; (b) optionally adding at least one additional inert solvent; (c) optionally adding additives selected from the group consisting of extender oils, modifiers, and antioxidants; and (d) initiating polymerization of the at least one vinyl monomer by the use of an initiator and/or heat, wherein a free radical is produced from the polymer containing a homolytically cleavable group.

15 Claims, No Drawings

OTHER PUBLICATIONS

Han, H. et al., "Boroxyl-Based Living Free Radical Initiators", Polymer Preprints 2002, 43 (2), p. 82.

Hawker, C.J., "Molecular Weight Control by a Living Free-Radical Polymerization Process", J. Am. Chem. Soc., 116, pp. 11185-11186, 1994.

Jayaraman, R.B. et al., "Epoxy and Hydroxy Functional Polyolefin Macromonomers", Journal of Polymer Science: Part A: Polymer Chemistry, vol. 34, pp. 1543-1552, 1996.

Kobatake, Seiya et al., "Block Copolymer Synthesis by Styrene Polymerization Initiated with Nitroxy-Functionalized Polybutadiene", Macromolecules preprinted from vol. 31, No. 11, pp. 3735-3739.

Li, Irene et al., "Synthesis, Characterization and Evaluation of Initiators for Living Free Radical Polymerization: Synthesis of Polystyrene with Controlled Structure", Polymer Preprints, vol. 36, No. 1, pp. 469-470, 1995.

Moad, Graeme et al., "Reactions of Benzoyloxyl Radicals with Some Common Vinyl Monomers", Makromol. Chem, Rapid Commun., pp. 533-536, 1992.

Pfaendner, Rudolf et al., "Nitroxyl Based Controlled Free Radical Polymerization—An Additives Manufacturer's Approach", presentation at Commercialization of Controlled Polymer Synthesis, San Francisc.

Priddy, Duane B. et al., "Utility/Limitations of Nitroxide Mediated Polymerization for Low Cost Manufacture of Improved Styrenic Polymers", Polymer Preprints 2002, 43 (2), p. 102.

Quirk, Roderic P. et al., "Anionic Synthesis of Amine-Functionalized Polybutadienes and Their Hydrogenated Analogs", Polymer Preprints 2002, 43(2), pp. 973-974.

Raether, Benedikt et al., "Free-Radical Synthesis of Block Copolymers on an Industrial Scale", Macromolecules Symp., vol. 177, pp. 25-41, 2002.

Tharanikkarasu, K. et al., "Tetraphenylethane Iniferters: Polyurethane-Polystyrene Multiblock Copolymers Through "Living" Radical Polymerization", Journal of Applied Polymer Science, vol. 66, pp. 1551.

Whitesides, G.M. et al., "Reaction of n-Butyllithium and 2,2,6,6-Tetramethylpiperidine Nitroxyl", J. Org. Chem., vol. 40, No. 23, pp. 3448-3450, 1975.

Maksymonko, John M., Office Action dated Jul. 3, 2008 from U.S. Appl. No. 11/617,850 (12 pp.).

Teskin, Fred M., Notice of Allowance dated Dec. 17, 2008 from U.S. Appl. No. 11/617,850 (6 pp.).

Nuyken, Oskar et al., "New Concepts for Controlled Radical Polymerization: The DPE-System", Polymer Preprints, vol. 43, No. 2, pp. 84-85 [2002].

Rizzardo, Ezio, "'Living' Free Radical Polymerisation", Chemistry in Australia, p. 32 [Jan.-Feb. 1987].

Peets, Monique R., Feb. 1, 2010 Notice of Allowance from U.S. Appl. No. 11/618,059 [5 pp.].

* cited by examiner

METHOD FOR GENERATING FREE RADICAL CAPABLE POLYMERS USING CARBONYL-CONTAINING COMPOUNDS

FIELD OF THE DISCLOSURE

The disclosure relates to methods of copolymerization using a free radical generating polymer such as a reversibly coupled polymer during the copolymerization reaction. The method may be advantageous in many fields such as preparing high impact polystyrene and other engineered plastics, wherein the use of such a free radical generating polymer as the rubber phase yields better dispersion and a controlled morphology such as reduced particle size, among other technical improvements.

BACKGROUND OF DISCLOSURE

Copolymerization is one of the most widely used techniques in the polymer industries. For example, polystyrene is one of the largest volume thermoplastic resins in commercial production today. However, homopolymer polystyrene resin is typically a brittle resin having a poor impact strength, and is only suited to applications where its brittleness is acceptable. It has long been known that impact strength of polystyrene can be greatly improved by the blending/grafting of rubbery particles dispersed throughout the polystyrene matrix. Polystyrene resins of improved strength achieved by incorporation of rubbery particles are often referred to as high impact strength polystyrene (HIPS).

The physical characteristics and mechanical properties of HIPS are dependent upon many factors, including rubber dispersion and rubber morphology. For example, when HIPS polymers are formed by incorporation of polybutadiene (PB) phase in polystyrene (PS) through the in situ formation of PB-graft-PS, phase separation begins early in the polymerization because of the immiscibility of the rubber within the polystyrene being formed and the depletion of the styrene phase. The immiscibility of PB in PS and the in situ formation of the compatibilizer, PB-graft-PS, gives rise to the formation of varied morphologies of the lamellar, globular, capsule, and other types. These microstructures are responsible for the absorption of energy when the material is subjected to high intensity (impact) or low intensity (tension) forces.

Copolymerization of styrene and butadiene is also necessary in preparing other rubber modified styrenic polymers such as as high impact polystyrene, styrene-maleic anhydride copolymer, methylmethacrylate-butadiene-styrene (MBS) copolymer, transparent impact polystyrene, and acrylonitrile butadiene styrene copolymer (ABS). ABS resin generally comprises a rigid matrix copolymer phase of styrene and acrylonitrile monomers having dispersed therein a graft copolymer of a butadiene rubber substrate grafted with the styrene/acrylonitrile copolymer. ABS resins are most often produced by initially preparing a polybutadiene seed latex and copolymerizing styrene and acrylonitrile in emulsion in the presence of the seed latex.

The copolymerization of styrene and polybutadiene to produce HIPS, ABS, and MBS typically is conducted via free radical polymerization between the styrene and polybutadiene. Free radical polymerization is typically initiated by the use of an initiator.

U.S. Publication 2006/0241265 discloses a method for converting an anionic living end of a polymer to a protected free radical "living" end. The polymer having a protected free radical "living" end may be used in the copolymerization of styrene and butadiene. Furthermore, U.S. Publication 2006/0241265 discloses that the polymer having a protected free radical "living" end may be reversibly coupled, such that upon decoupling, a free radical is generated for further copolymer chain reaction.

Advantageously, the present invention provides a novel method of copolymerization that involves reversibly coupling a polymer having a protected free radical "living" end by using a carbonyl-containing compound.

SUMMARY OF DISCLOSURE

Provided is a method comprising reacting the anionic living end of a polymer that is end capped with a steric hindering compound with a carbonyl-containing compound to produce a polymer with a homolytically cleaveable group, wherein the carbonyl-containing compound has the following formula (I)

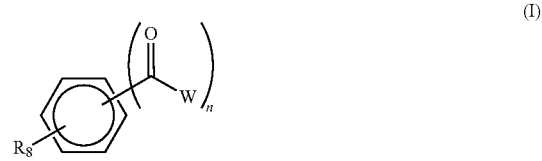

in which $R_8$ is optional but when present is U or C1-C12 alkyl; W is a substituted or unsubstituted aryl group; or W is $-OR_9$ wherein $R_9$ is a straight or branched, substituted or unsubstituted, cyclic or acyclic alkyl group; and n is an integer of 1-6, unless $R_8$ is present and then n is an integer of 1-5. Cleavage or loss of the homolytically cleaveable group will produce a free radical containing polymer.

A method of producing an engineered plastic selected from the group consisting of high impact polystyrene, styrene-maleic anhydride copolymer, methylmethaerylate-butadiene-styrene copolymer, transparent impact polystyrene, and acrylonitrile butadiene styrene copolymer is also provided. The method comprises the steps of: (a) adding a polymer having an anionic living end that is end capped with a steric hindering compound and reacted with a carbonyl-containing compound to produce a polymer with a homolytically cleaveable group to a solvent comprising at least one vinyl monomer; (b) optionally adding at least one additional inert solvent: (c) optionally adding additives selected from the group consisting of extender oils, modifiers, and antioxidants; and (d) initiating polymerization of the at least one vinyl monomer by the use of an initiator and/or heat, wherein the carbonyl-containing compound has the following formula (I)

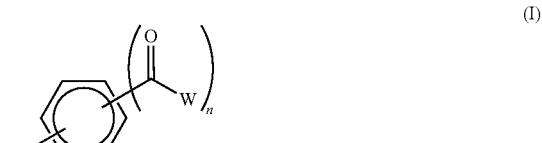

Also provided is a method comprising reacting the anionic living end of a polymer that is end capped with a steric hindering compound and contains a high vinyl end segment with a carbonyl-containing compound with the following formula (I),

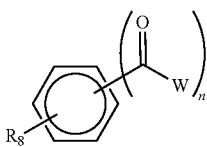
(I)

where $R_8$ is optional but when present is H or C1-C12 alkyl; W is a substituted or unsubstituted aryl group; or W is —$OR_9$ wherein $R_9$ is a straight or branched, substituted or unsubstituted, cyclic or acyclic alkyl group; and n is an integer of 1-6, unless $R_8$ is present and then n is an integer of 1-5, and where the polymer with a high vinyl end segment is produced by a process comprising the steps of: (a) forming a living prepolymer high vinyl initiator with a vinyl content greater than about 45% using a vinyl modifier, (b) adding a $R_1R_2R_3$aluminum or $R_1R_2R_3$boron compound to nullify the effect of the vinyl modifier, and (c) initiating polymerization of diene monomers using said living prepolymer high vinyl initiator so as to form a polymer product with at least one high vinyl end segment, where $R_1$, $R_2$, and $R_3$ are selected from the group consisting of C1-C12 alkyl, C2-C12 alkene, C2-C12 alkyne, phenyl, alkyl-substituted phenyl and may all be identical or may all be separately selected but cannot be H.

DETAILED DESCRIPTION

Providing an Anionic Polymer with a Living End

An anionic polymer with a living end is first created by polymerizing monomers subject to living anionic polymerization. As a skilled artisan can appreciate, the anionic living end typically is formed by nucleophilic addition of an anionic initiator to the monomer.

Suitable monomers subject to living anionic polymerization include, but are not limited to, vinyl aromatic monomers, conjugated dienes, and ethylene. Exemplary vinyl aromatic monomers include 1,2-diphenyl-4-methyl-1-hexene, styrene, α-methylstyrene, p-methylstyrene, vinyl toluene, vinyl anthracene, vinyl pyridines such as 2-vinylpyriene and 4-vinylpyridine, vinyl naphthalene such as 1-vinylnaphthalene, 2-vinylnaphthalene, 1-α-methylvinylnaphthalene, 2-α-methylvinylnaphthalene, and the like, and mixtures thereof. Exemplary conjugated dienes include 1,3-butadiene, isoprene (2-methyl-1,3-butadiene), 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene, and the like.

Exemplary anionic initiators include organolithium compounds, which are known in the art as being useful in the polymerization of the anionicaily polymerizable monomers. Suitable organolithium compounds include mono-lithium compounds represented by the formula as shown below,

wherein $R_0$ is a hydrocarbyl group containing 1 to 20, preferably 2-8, carbon atoms per $R_1$ group. Typical $R_0$ groups include aliphatic radicals and cycloaliphatic radicals, such as alkyl, cycloalkyl, cycloalkylalkyl, alkylcycloalkyl, alkenyl, aryl and alkylaryl radicals. Specific examples of $R_0$ groups include, but are not limited to, alkyls such as methyl, ethyl, n-propyl, isopropyl, n-butyl, isobutyl, t-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

Suitable organolithium compounds also include multiple-lithium compounds. The multiple-lithium compounds include, but are not limited to, 1,4-dilithiobutane, 1,5-dilithiopentane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,5,8-tetralithiodecane, 1,5,10,20-tetralithioeicosane, 1,2,4,6-tetralithiocyclohexane, 4,4'-dilithiobiphenyl, and the like, and the mixture thereof.

Specific suitable lithium initiators include n-butyllithium, sec-butyllithium, tert-butyllithium, 1,4-dilithiobutane, 1,3-(di-2-(2-lithio-4-methyl)pentenyl)benzene, and any mixture thereof.

The anionic initiator is employed in an amount designed to result in the desired molecular weight of the polymer. The ratio of millimoles of the anionic initiator per hundred grams of the anionically polymerizable monomer ranges between 0.1 millimoles to 100 millimoles, or between 0.2 millimoles to 20 millimoles, or between 0.5 millimoles to 4 millimoles.

A vinyl modifier may be added to increase the 1,2-addition reaction of a diene monomer. Such modifying agents are known in the art. These modifying agents may be employed in amounts generally ranging from about 1:100 to about 100:1 molar ratio of the modifier to anionic initiator. The 1,2-addition product can be increased from about the 5-15% range to as high as about 100% of the diene monomer units being incorporated into the anionic polymer with a living end.

Exemplary vinyl modifiers include one or more of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, dipiperidino ethane, tri-n-propyl amine, trimethyl amine, triethyl amine, N,N-dimethyl aniline, N-ethylpiperidine, N-methyl-N-ethyl aniline, and N-methylmorpholine.

The reaction conditions such as solvent and temperature for the anionic polymerization can be so finely controlled that they are compatible with the selection of the anionic initiator and the anionically polymerizable monomer. Some representative examples of suitable aliphatic solvents include n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. The polymerization reaction is generally conducted for a time sufficient to obtain at least about 80% and preferably about 99% conversion of charged monomer units. The $M_n$ of the uncoupled polymer is in the range of about 20,000 to 500,000, more preferably in the range of about 30,000 to 400,000, and most preferably in the range of about 40,000 to about 300,000.

It may be desirable for the anionic polymer with a living end to have a high vinyl end segment. In one embodiment, an anionic polymer with a living end may be created by (a) forming a living prepolymer high vinyl initiator with a vinyl content greater than about 45% using a vinyl modifier, (b) adding a $R_1R_2R_3$aluminum or $R_1R_2R_3$boron compound to nullify the effect of the vinyl modifier, and (c) initiating polymerization of diene monomers using said living prepolymer high vinyl initiator so as to form a polymer product with at least one high vinyl end segment, where $R_1$, $R_2$, and $R_3$ are selected from the group consisting of C1-C12 alkyl, C2-C12 alkene, C2-C12 alkyne, phenyl, and alkyl-substituted phenyl, and may all be identical or may all be separately selected but cannot be H.

Preparation of the living prepolymer high vinyl initiator is carried out by adding an initiator to a mixture of monomers in the presence of a vinyl modifier. Any initiator known in the art as suitable for the polymerization of conjugated dienes may be used. Suitable initiators include the suitable anionic initiators mentioned above.

The anionic initiator is employed in an amount designed to result in the desired molecular weight of the polymer. The ratio of millimoles of the anionic initiator per hundred grams of the anionically polymerizable monomer ranges between 0.1 millimoles to 100 millimoles, or between 0.2 millimoles to 20 millimoles, or between 0.5 millimoles to 4 millimoles.

Initiator is added to a mixture of monomers in a suitable hydrocarbon solvent in the presence of a vinyl-modifier. Exemplary monomers include conjugated dienes and vinyl monomers. Exemplary conjugated dienes include 1,3-butadiene, isoprene (2-methyl-1,3-butadiene), 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene, and the like. Exemplary vinyl monomers include 1,2-diphenyl-4-methyl-1-hexene, styrene, α-methylstyrene, p-methylstryrene, vinyl toluene, vinyl anthracene, vinyl pyridines such as 2-vinylpyriene and 4-vinylpyridine, vinyl naphthalene such as 1-vinylnaphthalene, 2-vinylnaphthalene, 1-α-methylvinylnaphthalene, 2-α-methylvinylnaphthalene, and the like, and mixtures thereof.

Suitable solvents used in the preparation of the living prepolymer high vinyl initiator include hydrocarbon solvents such as pentane, hexane, heptane, octane, nonane, decane, cyclopentane, cyclohexane, cycloheptane, cyclooctane, and mixtures thereof.

A vinyl modifier is added to increase the 1,2-addition reaction of the diene monomer in the preparation of the living prepolymer high vinyl initiator. Such modifying agents are known in the art. These modifying agents may be employed in amounts generally ranging from about 1:100 to about 100:1 molar ratio of the modifier to anionic initiator. This yields a living prepolymer with molecular weight of about 500 to about 5,000. The 1,2-addition product can be increased from about the 5-15% range to as high as about 90-100% of the diene monomer units being incorporated into the living prepolymer high vinyl initiator. The preferred vinyl content of the living prepolymer high vinyl initiator is greater than about 45%, more preferably greater than about 50%.

Exemplary vinyl modifiers include one or more of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, 2-2'-di(tetrahydrofuryl) propane, bis-oxalanyl propane, dipiperidino ethane, tri-n-propyl amine, trimethyl amine, triethyl amine, N,N-dimethyl aniline, N-ethylpiperidine, N-methyl-N-ethyl aniline, and N-methylmorpholine.

The number average molecular weight ($M_n$) of the living prepolymer high vinyl initiator is in the range of about 100 to 20,000, preferably in the range of about 250 to 5000, and most preferably in the range of about 500 to 2500.

After forming the living prepolymer high vinyl initiator, a $R_1R_2R_3$aluminum or $R_1R_2R_3$boron compound is added to the living prepolymer high vinyl initiator. In the above formulas, $R_1$, $R_2$, and $R_3$ are selected from the group consisting of C1-C12 alkyl, C2-C12 alkene, C2-C12 alkyne, phenyl, and alkyl-substituted phenyl, and may all be identical or may all be separately selected but cannot be H. Exemplary $R_1R_2R_3$aluminum or $R_1R_2R_3$boron compounds include trialkyl compounds. Suitable trialkyl compounds include triethylaluminum, trimethylaluminum, and triisobutylaluminum.

The purpose of adding the $R_1R_2R_3$aluminum or $R_1R_2R_3$boron compound is to nullify the effect of the vinyl modifier. One advantage of nullifying the effect of the vinyl modifier is that additional monomers may be subsequently polymerized into a low vinyl content configuration by simply combining the mixture of living prepolymer high vinyl initiator and $R_1R_2R_3$aluminum or $R_1R_2R_3$boron compound with additional monomer and a suitable solvent. The living prepolymer high vinyl initiator initiates the polymerization of the monomers by continuing living anionic polymerization. Thus, a living polymer with one high vinyl end segment is produced.

Preferred monomer units that may be added to the living prepolymer high vinyl initiator are conjugated dienes and vinyl-substituted aromatic hydrocarbons. The polymers with one high vinyl end segment can contain more than one monomer unit, in a random or block configuration. Suitable conjugated dienes include one or more of 1,3-butadiene, isoprene, 2,3-dimethyl-1,3-butadiene, and 1,3-pentadiene. Preferred conjugated dienes are 1,3-butadiene and/or isoprene.

Suitable vinyl-substituted aromatic hydrocarbons include one or more of styrene, α-methylstyrene, 1-vinyl naphthalene, 2-vinyl naphthalene, 1-α-methy vinyl naphthalene, 2-α-methyl vinyl naphthalene, as well as alkyl, cycloalkyl, aryl, alkaryl, and aralkyl derivatives thereof, in which the total number of carbon atoms in the combined hydrocarbon is generally not greater than 12, as well as any di- or tri-vinyl substituted aromatic hydrocarbons. One preferred vinyl-substituted aromatic hydrocarbon is styrene. If the di- or tri-vinyl substituted aromatic hydrocarbons are used, the resulting polymer has a branched and/or crosslinked structure.

Suitable solvents in this step include one or more of pentane, hexane, heptane, octane, nonane, decane, cyclopentane, cyclohexane, cycloheptane, cyclooctane.

The polymerization temperature can vary over a broad range from about −50° C. to about 200° C., or from about −20° C. to about 140° C. One advantage of using the $R_1R_2R_3$aluminum or $R_1R_2R_3$boron compound to nullify the effect of the vinyl modifier is that the polymerization temperature does not have to be significantly higher than the temperature at which the living prepolymer high vinyl initiator is formed to create a lower vinyl content. Accordingly, the polymerization temperature may optionally be no more than 20° C. higher than the temperature(s) at which the living prepolymer high vinyl initiator is formed or the $R_1R_2R_3$aluminum or $R_1R_2R_3$boron compound is added. The pressure used preferably is sufficient to maintain the fluidity of the substantially liquid phase under the conditions of the polymerization reaction.

The polymerization reaction is generally conducted for a time sufficient to obtain at least about 80% and preferably about 99% conversion of charged monomer units. The $M_n$ of the uncoupled polymer is in the range of about 20,000 to 500,000, more preferably in the range of about 30,000 to 400,000, and most preferably in the range of about 40,000 to about 300,000.

The living prepolymer high vinyl end segment accounts for a minor portion of the total weight of the polymer composition. For example, the living prepolymer high vinyl end segment may account for less than about 15% of the total weight of the polymer composition, or less than about 10% of the total weight, or less than about 5%. Therefore, the vinyl content of the living prepolymer high vinyl end segment has very little effect on the total vinyl content of the polymer composition. The preferred vinyl content of the total polymer composition is less than about 35%, and preferably less than about 30%.

The living polymer with one high vinyl end segment produced from a living prepolymer high vinyl initiator may be produced by a batch or a continuous process. To make the living polymer in a continuous mode, the living prepolymer high vinyl initiator is made continuously in one reactor and fed to a second reactor where the living polymer with one high vinyl end segment is produced.

Converting the Anionic Polymer with a Living End to a Free Radical Capable Polymer To convert the anionic polymer with a living end to a free radical generating polymer, the anionic living end may be converted to a protected free radical "living" end. Typically, a protected free radical "living" end comprises a relatively weak bond that is capable of being homolytically cleaved in a controlled manner, thus giving a radical species useful for initiating, or participating in, fee radical polymerization or copolymerization with free radical polymerizable monomers.

In one embodiment, the conversion of an anionic living end of the first polymer into a protected free radical "living" end comprises:

(a) reacting the anionic living end of a first polymer with a capping agent to generate an end-capped anionic living end; and (b) terminating the end-capped anionic living end with a carbonyl-containing compound.

The capping agent may comprise a steric hindering compound as shown below:

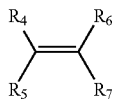

in which $R_4$ and $R_5$ can be each independently H, methyl, or ethyl; and at least one of $R_6$ and $R_7$ is a hindering group such as cyclic and polycyclic aryl group containing from 6 to 18 carbon atoms. In preferred embodiments, $R_6$ is a hindering group, and $R_7$ is also a hindering group which is same as or different from $R_6$.

A specific example of a suitable capping agent is 1,1-diphenylethylene (DPE).

The appropriate amount of capping agent is calculated based on the amount needed to react with the number of initiator atoms present in the polymer.

The end-capped anionic living end of the polymer may then be reversibly coupled with a coupling agent. Termination of the end-capped anionic living end or coupling two of the end-capped anionic living ends may be accomplished in the presence of a carbonyl-containing compound. Preferably, the carbonyl-containing compound has a general formula as shown below:

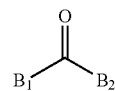

wherein at least one of $B_1$ and $B_2$ is a bulky group, preferably, both $B_1$ and $B_2$ are bulky groups. A bulky group is typically any chemical group that contains four or more carbon atoms, such as a phenyl or a isobutyl group.

Suitable carbonyl-containing compounds include ketone and ester compounds. For example, the carbonyl-containing compounds may have the following formula (I)

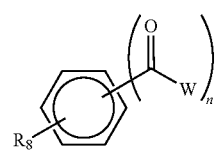

in which $R_8$ is optional but when present is H or C1-C12 alkyl; W is a substituted or unsubstituted aryl group; or W is —$OR_9$ wherein $R_9$ is a straight or branched, substituted or unsubstituted, cyclic or acyclic alkyl group; and n is an integer of 1-6 unless $R_8$ is present and then n is an integer of 1-5.

The formula (I) compound may comprise benzophenone, benzoate ester, or one of the following compounds, and any mixture thereof:

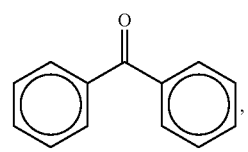

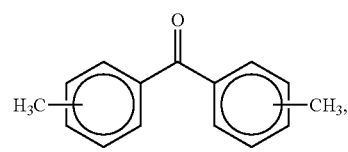

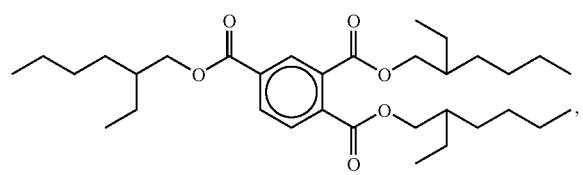

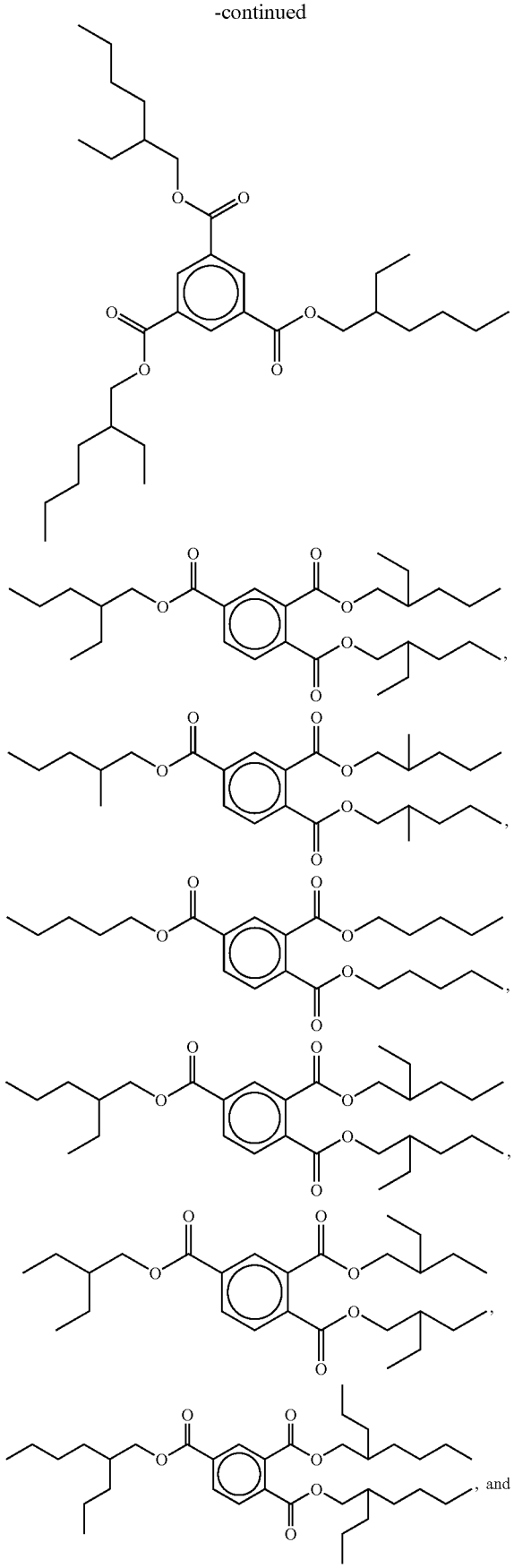

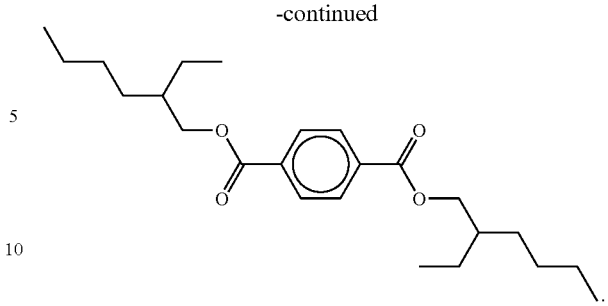

The capping agent may be added at the polymerization temperature, which may be the temperature in the reaction vessel at the end of the polymerization. The terminator may also be added at the polymerization temperature, although, because terminators are generally very reactive, they can effectively be added at a lower temperature than that used for the polymerization.

The protected free radical "living" end comprises a relatively weak bond that is capable of being homolytically cleaved in a controlled manner, thus giving a radical species useful for initiating, or participating in, free radical polymerization or copolymerization with free radical polymerizable monomers. The weak bond may be homolytically cleaved by decoupling the coupled polymer. Decoupling may be accomplished by heating and/or copolymerization processing.

Copolymerizing the Free Radical Generating Polymer with Free Radical Polymerizable Monomers The polymer containing a homolytically cleavable group may be added to a solvent comprising at least one vinyl monomer.

Suitable solvents include hydrocarbon solvents such as pentane, hexane, heptane, octane, nonane, decane, cyclopentane, cyclohexane, cycloheptane, cyclooctane, and mixtures thereof.

Suitable vinyl monomers are those that are polymerizable by free radical polymerization, such as, for example, monosubstituted or unsymmetrically (1,1-) disubstituted ethylenes. Exemplary vinyl monomers include, but are not necessarily limited to, styrene, x-methyl styrene, ethyl styrene, propyl styrene, p-vinyl toluene, p-amino styrene, diethylaminostyrene (all isomers), vinyl biphenyl, vinyl naphthalene, vinyl anthracene, acrylonitrile, methacrylonitrile, itaconic acid, itaconic anhydride, methacrylic acid, methyl methacrylate, ethyl methacrylate, propyl methacrylate, (all isomers), butyl methacrylate (all isomers), 2-ethylhexyl methacrylate, isobornyl methacrylate, benzyl methacrylate, phenyl methacrylate, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropylmethoxysilylpropyl methacrylate, dimethoxysilylpropyl methacrylate, diethoxysilylpropyl methacrylate, dibutoxysilylpropyl methacrylate, diisopropoxysilylpropyl methacrylate, acrylic acid, methyl acrylate, ethyl acrylate, propyl acrylate (all isomers), butyl acrylate (all isomers), 2-ethylhexyl acrylate, isobornyl acrylate, benzyl acrylate, phenyl acrylate, glycidyl acrylate, 2-hydroxyethyl acrylate, hydroxypropyl acrylate (all isomers), hyroxybutyl acrylate (all isomers), N,N-diethylaminoethyl acrylate, triethyleneglycol acrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropylmethoxysilylpropyl acrylate, dimethoxysilylpropyl acrylate, diethoxysilylpropyl acrylate, dibutoxysilylpropyl acrylate, diisopropoxylsilylpropyl acrylate, acrylamide, N-methyl acrylamide, N,N-dimethyl acrlyamide, N-n-butylacrylamide, N-tert-butylacrylamide, N-methylolacrylamide, N-ethylolacrylamide, methacrylamide, dimethylaminopropyl methacrylamide, N-tert-butylmethacrylamide, N-n-butylmethacrylamide, N-methylolmethacrylamide, N-ethylolmethacrylamide, vinyl benzoic acid (all isomers), α-methylvinyl benzoic acid (all isomers), diethylamino α-methylstyrene (all isomers), p-vinylbenzene sulfonic acid, p-vinylbenzene sulfonic acid sodium salt, vinyl acetate, vinyl butyrate, vinylbenzoate, vinyl chloride, vinyl fluoride, vinyl bromide, vinyltrimethylsilane, tetrafluoroethylene, chlorotrifluoroethylene, maleic anhydride, N-phenylmaleimide, N-vinylpyrrolidone, N-vinylcarbazole, crotonic acid, methyl crotonate, cyclopentene, cyclohexene, cycloheptene, cyclooctene, norbornene, cyclic vinyl ethers, 2,3-dihydrofuran, 3,4-dihydropyran, allylic alcohol, vinylethylene carbonate, diethylfumarate, vinyl alkyl ethers such as ethyl vinyl ether, isoprene, chloroprene, ethylene, propylene, butadiene, and the like, and the mixture thereof.

The ratio between the total weight of the polymer containing a homolytically cleavable group and the total weight of the at least one vinyl monomer may generally range from about 1:100 to about 20:100, or from about 2:100 to about 15:100, or from about 5:100 to about 10:100. For example, in a HIPS processing, the polymerization of styrene may be performed in the presence of about 5-20% dissolved polybutadiene or butadiene copolymer.

Optionally, at least one additional inert solvent may be added to the mixture of the polymer containing a homolytically cleavable group and the at least one vinyl monomer. Suitable inert solvents include one or more of pentane, hexane, heptane, octane, nonane, decane, cyclopentane, cyelohexane, cycloheptane, cyclooctane.

Optionally, additives selected from the group consisting of extender oils, modifiers, and antioxidants may be added to the mixture of the first polymer and at least one vinyl monomer. Any extender oil, modifier, and antioxidant may be used. Such materials are well known to those skilled in the art. Specific examples of useful antioxidants and stabilizers include 2-(2'-hydroxy-5'-methylphenyl) benzotriazole, nickel di-butyl-di-thiocarbamate, tris(nonylphenyl) phosphite, 2,6-di-t-butyl-4-methylphenol, and the like. Exemplary conventional fillers and pigments include silica, carbon black, titanium dioxide, iron oxide, and the like. These compounding ingredients are incorporated in suitable amounts depending upon the contemplated use of the product, preferably in the range of 1-350 parts by weight of additives or compounding ingredients per 100 parts by weight of the polymer composition.

A reinforcing agent may be defined as material added to a resinous matrix to improve the strength of the polymer. Most reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion, and processability.

The polymer containing a homolytically cleavable group is then polymerized with the at least one vinyl monomer. Polymerization is accomplished by initiating the reaction by the use of an initiator and/or heat. Suitable initiators include free radical initiators. Any free radical initiator known in the art may be used. Exemplary free radical initiators include dilauroyl peroxide lauroyl acid, dioctanoyl peroxide caprylic acid, didecanoyl peroxide n-decanoic acid, di-n-propionyl peroxide propionic acid, bis(3,5,5-trimethyl hexanoyl) 3,5,5-trimethyl peroxide hexanoic acid, dibenzoyl peroxide benzoic acid, bis(2,4-dichlorobenzoyl) 2,4 dichlorobenzoic acid peroxide, bis(o-methybenzoyl) peroxide o-methyl benzoic acid, acetyl cyclohexane sulphonyl cyclohexane sulphonic peroxide acid, t-butylperoxypivalate pivalic acid, t-butyl peroxy-2-ethylhexanoate 2-ethyl caproic acid, t-butyl peroxy isobutyrate isobutyric acid, t-butyl peroxybenzoate benzoic acid, and mixtures thereof.

Initiating polymerization by the use of an initiator and/or heat causes a free radical to be produced from the polymer containing a homolytically cleavable group. The free radical is then capable of initiating or participating in the copolymerization of the polymer containing a homolytically cleavable group and the at least one vinyl monomer.

Polymerization of the polymer containing a homolytically cleavable group with the at least one vinyl monomer may be accomplished in bulk, suspension, solution, or emulsion. Such methods are well known to those skilled in the art.

The copolymerization of this disclosure may be used to produce engineered plastics. Exemplary engineered plastics that may be prepared by the process of the disclosure include, but are not limited to, high impact polystyrene, styrene-maleic anhydride copolymer, methylmethacrylate-butadiene-styrene copolymer, transparent impact polystyrene, and acrylonitrile butadiene styrene copolymer.

The present invention will be described in more detail with reference to the following examples. The following examples are presented for purposes of illustration only and are not to be construed in a limiting sense.

EXAMPLES

Example 1

Synthesis of polymer: To a 1-gallon stainless steel reactor under a $N_2$ blanket was charged 3.0 lbs of 21.5% 1,3-butadiene in technical grade hexane, 3.0 lbs of technical grade hexane and 67 grams of 33% styrene in hexane. All solvents were dried to less than 5 ppm water and oxygen free. 64.7 mmol of n-butyl lithium (nBuLi) was charged to the reactor and polymerization was allowed to proceed for 5 and ⅓ hours at 123-127° F. 308 grams of a control sample was taken and live cement (polymer in solvent) was terminated with isopropanol. A second 308 gram sample was also taken. It was calculated that a maximum of 51.3 mmol of carbon-bound lithium was still present in the reactor. 50.4 mmol of 1,1-diphenylethylene and 16 mmol of the vinyl modifier 2,2-di (tetrahydrofuryl) propane were added to the reactor and allowed to react for 2.75 hours at 125° F. and a further 16 hours at ~70° F. A sample was taken for G.C. analysis and it was determined that 23.6% of the 1,1-diphenylethylene remained unreacted. A 300 gram sample was taken in a $N_2$ purged crown-capped bottle and 6.88 mmol of benzophenone were added to terminate the polymer. (It was calculated that a maximum of 0.021 mmol carbon-bound lithium was present per gram of cement.) Both the control sample and the experimental polymer were worked up by evaporating the hexane in a rotoevaporator and finishing in a vacuum oven at 50° C. Molecular weight analysis results by Gel Permeation Chromatography (GPC) are shown in Table 1. Mw represents the weight average molecular weight, and Mn represents the number average molecular weight.

TABLE 1

| Sample | Control BR | Benzophenone Terminated BR |
|---|---|---|
| Mn | 4,800 | 5,100 |
| Mw/Mn | 1.142 | 1.159 |
| Mp | 5,800 | 5,900 |
| % Coupled | 0.0% | 0.0% |

Polymerization of styrene in presence of the polymer: For each polymer sample, the following procedure was followed. 1.5 grams of polymer was dissolved in 10 grams of styrene monomer in a thick-walled crown-capped pyrex test-tube. The solutions were polymerized for 5 hours at 135° C. Toluene was used to help remove the polymer cements from the test-tubes. Solvent and unreacted styrene were evaporated in a fume hood and finished in a vacuum oven for several hours at 100° C. The percent grafting of BR to the polystyrene was calculated from Gradient GPC. Gradient GPC is done by separating the polymer sample by macrostructure type using a solvent gradient from 100% acetonitrile to 100% THF. Polymers are separated according to their solubility in the solvent, but not by molecular weight. Analysis is shown in Table 2.

TABLE 2

| Sample | Control BR + PS | Benzophenone terminated BR + PS |
|---|---|---|
| % Styrene Conversion | 66% | 57.2% |
| % Grafting of BR to PS | 16.3% | 52.9% |

Example 2

Synthesis of polymer: To a 1 gallon stainless steel reactor under a N₂ blanket was charged 4.4 lbs of 21.8% 1,3-butadiene in technical grade hexane and 1.6 lbs of technical grade hexane. All solvents were dried to less than 5 ppm water and oxygen free. 4.2 mmol of nBuLi was charged to the reactor and polymerization was allowed to proceed for 3 and ½ hours at 125-140° F. A control sample of approximately 600 grams was taken and live cement was terminated with isopropanol. It was calculated that a maximum of 3.3 mmol of carbon-bound lithium was still present in the reactor. 4.2 mmol of 1,1-diphenylethylene and 4.2 mmol of the modifier 2,2-di (tetrahydrofuryl) propane were added to the reactor and allowed to react for 15 minutes at 135° F. before dropping 328 grams of live cement into a crown-capped N₂ purged bottle. 1.05 mmol of benzophenone was added to the bottle. After 16 hours the cement was coagulated in isopropanol plus 0.5 g of butylated hydroxytoluene antioxidant (BHT). The cements were drum-dried. Molecular weight analysis results by Gel Permeation Chromatography (GPC) are shown in Table 3.

TABLE 3

| Sample | Control BR | 1,1-DPE + benzophenone terminated BR |
|---|---|---|
| Mn | 91,200 | 93,700 |
| Mw/Mn | 1.022 | 1.061 |
| Mp | 93,600 | 94,000 |
| % Coupled | 0.0% | 6.1% |

Polymerization of styrene in presence of the polymer: For each polymer sample, the following procedure was followed. 2.0 grams of polymer was dissolved in 18 grams of styrene monomer in a thick-walled crown-capped pyrex test-tube. The solutions were polymerized for 2 hours at 120-170° C. Toluene was used to help remove the polymer cements from the test-tubes. Solvent and unreacted styrene were evaporated in a fume hood and finished in a vacuum oven for several hours at 100° C. Percent grafting of BR to the polystyrene was calculated from Gradient GPC. Gradient GPC is done by separating the polymer sample by macrostructure type using a solvent gradient from 100% acetonitrile to 100% THF. Polymers are separated according to their solubility in the solvent, but not by molecular weight. Analysis is shown in Table 4.

TABLE 4

| Sample | Control BR + PS | Benzophenone terminated BR + PS |
|---|---|---|
| % Styrene Conversion | 13.3% | 31.1% |
| % Grafting of BR to PS | 16.2% | 37.6% |

Example 3

Synthesis of polymer: To a 1-gallon stainless steel reactor under a N₂ blanket was charged 3.0 lbs of 21.5% 1,3-butadiene in technical grade hexane, 3.0 lbs of technical grade hexane and 67 grams of 33% styrene in hexane. All solvents were dried to less than 5 ppm water and oxygen free. 64.7 mmol of nBuLi was charged to the reactor and polymerization was allowed to proceed for 5 and ⅓ hours at 123-127° F. 308 grams of a control sample was taken and live cement was terminated with isopropanol. A second 308 grams sample was also taken. It was calculated that a maximum of 51.3 mmol of carbon-bound lithium was still present in the reactor. 50.4 mmol of 1,1-diphenylethylene and 16 mmol of the vinyl modifier 2,2-di (tetrahydrofuryl) propane were added to the reactor and allowed to react for 2.75 hours at 125° F. and a further 16 hours at ~70° F. A sample was taken for G.C. analysis and it was determined that 23.6% of the 1,1-diphenylethylene remained unreacted. A 305 gram sample was taken in a N₂ purged crown-capped bottle and 6.3 mmol of butyl benzoate (an excess) was added to terminate the polymer. (It was calculated that a maximum of 0.021 mmol carbon-bound lithium was present per gram of cement.) A 298 gram sample was taken in a second N₂ purged crown-capped bottle and 1.04 mmol of trioctyltrimellitate (TOTM) was added to terminate the polymer. Both the control sample and the two experimental polymers were worked up by evaporating the hexane in a rotoevaporator and finishing in a vacuum oven at 50° C. Molecular weight analysis results by Gel Permeation Chromatography (GPC) are shown in Table 5.

TABLE 5

| Sample | Control BR | Butyl Benzoate Terminated BR | TOTM Terminated BR |
|---|---|---|---|
| Mn | 4,800 | 5,800 | 7,100 |
| Mw/Mn | 1.142 | 1.238 | 1.513 |
| Mp | 5,800 | 6,100 | 6,100 |
| % Coupled | 0.0% | NA | NA |

Polymerization of styrene in presence of the polymer: For each polymer sample, the following procedure was followed. 1.5 grams of polymer was dissolved in 10 grams of styrene monomer in a thick-walled crown-capped pyrex test-tube. The solutions were polymerized for 5 hours at 135° C. Toluene was used to help remove the polymer cements from the test-tubes. Solvent and unreacted styrene were evaporated in a fume hood and finished in a vacuum oven for several hours at 100° C. The percent grafting of BR to the polystyrene was calculated from Gradient GPC. Gradient GPC is done by separating the polymer sample by macrostructure type using a solvent gradient from 100% acetonitrile to 100% THF. Polymers are separated according to their solubility in the solvent, but not by molecular weight. Analysis is shown in Table 6.

TABLE 6

| Sample | Control BR + PS | Butyl Benzoate Terminated BR + PS | TOTM Terminated BR + PS |
|---|---|---|---|
| % Styrene Conversion | 66% | 63.5% | 58.8% |
| % Grafting of BR to PS | 16.3% | 71.7% | 66.5% |

What is claimed is:

1. A method comprising reacting the living end of a polymer that is end capped with a steric hindering compound with a carbonyl-containing compound to produce a polymer with a homolytically cleaveable group,
   wherein the carbonyl-containing compound is selected from the group consisting of the following compounds or any mixtures thereof:

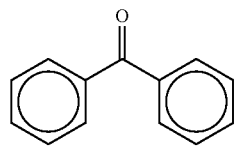

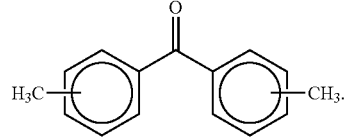

2. A method as claimed in claim 1 wherein said end-capped living end is produced by reacting an anionic living end of a polymer with a capping agent that is a steric hindering compound.

3. A method as claimed in claim 1 wherein said steric hindering compound is a vinyl aromatic compound.

4. A method as claimed in claim 1 wherein said steric hindering compound is selected from the group consisting of styrene, methyl styrene, butyl styrene, and alpha-methyl styrene.

5. A method as claimed in claim 1 wherein said steric hindering compound is 1,1-diphenylethylene.

6. A method as claimed in claim 1 wherein said living end of a polymer is formed by reacting at least one anionically polymerizable monomer with an anionic initiator to produce a polymer of a desired length with an anionic living end.

7. A method as claimed in claim 6 wherein said anionic initiator is an organolithium compound.

8. A method as claimed in claim 1 wherein said polymer comprises at least one conjugated diene and optionally at least one vinyl aromatic compound.

9. A method as claimed in claim 6 wherein said anionically polymerizable monomer comprises at least one conjugated diene and optionally at least one vinyl aromatic compound.

10. A method as claimed in claim 8 wherein said at least one conjugated diene comprises 1,3-butadiene.

11. A method as claimed in claim 9 wherein said at least one conjugated diene comprises 1,3-butadiene.

12. A method comprising the steps of:
   (a) adding the polymer produced in any one of the preceding claims to a solvent comprising at least one vinyl monomer;
   (b) optionally adding at least one additional inert solvent;
   (c) optionally adding additives selected from the group consisting of extender oils, modifiers, and antioxidants,
   (d) initiating polymerization of the vinyl monomer by the use of an initiator and/or heat,
   wherein steps (a), (b) and (c) can be performed in any order;
   whereby the result of steps (a)-(d) is production of an engineered plastic; and
   wherein the engineered plastic is selected from the group consisting of high impact polystyrene, styrene-maleic anhydride copolymer, methylmethacrylate-butadiene-styrene copolymer, transparent impact polystyrene, and acrylonitrile butadiene styrene copolymer; and
   wherein during step (d) a free radical is produced from said polymer added in step (a).

13. A method comprising
   reacting the anionic living end of a polymer that is end capped with a steric hindering compound and contains a high vinyl end segment with a carbonyl-containing compound, where said carbonyl-containing compound is selected from the group consisting of the following compounds or any mixtures thereof:

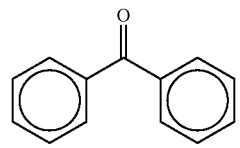

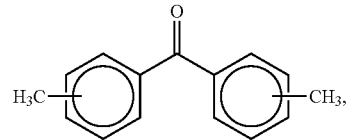

where the polymer with a high vinyl end segment is produced by a process comprising the following steps:
   a. forming a living prepolymer high vinyl initiator with a vinyl content greater than about 45% using a vinyl modifier,
   b. adding a $R_1R_2R_3$aluminum or $R_1R_2R_3$boron compound to nullify the effect of the vinyl modifier, and
   c. initiating polymerization of diene monomers using said living prepolymer high vinyl initiator so as to form a polymer product with at least one high vinyl end segment
   where $R_1$, $R_2$, and $R_3$ are selected from the group consisting of C1-C12 alkyl, C2-C12 alkene, C2-C12 alkyne, phenyl, alkyl-substituted phenyl and may all be identical or may all be separately selected but cannot be H.

14. A method as claimed in claim 1, wherein said carbonyl compound has the following formula:
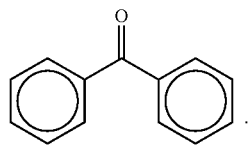
15. A method as claimed in claim 13, wherein said carbonyl compound has the following formula:
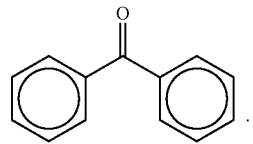
* * * * *